United States Patent [19]
Grodzins

[11] Patent Number: 5,251,240
[45] Date of Patent: Oct. 5, 1993

[54] METHOD AND APPARATUS FOR EMPLOYING RESONANCE-PRODUCED GAMMA RAYS TO DETECT THE PRESENCE OF BOTH NITROGEN AND OXYGEN IN OBJECTS THAT MAY CONTAIN EXPLOSIVES

[75] Inventor: Lee Grodzins, Lexington, Mass.

[73] Assignee: Massachusetts Institute of Technology, Cambridge, Mass.

[21] Appl. No.: 518,785

[22] Filed: May 4, 1990

[51] Int. Cl.$^5$ .................................................. G01N 23/00
[52] U.S. Cl. .................................... 376/157; 376/194; 378/57
[58] Field of Search ............... 376/194, 195, 157, 156, 376/153, 159; 378/57, 53, 120; 250/390.04

[56] References Cited

U.S. PATENT DOCUMENTS

| | | | |
|---|---|---|---|
| 3,171,961 | 3/1965 | Yule | 376/166 |
| 3,997,787 | 12/1976 | Fearon et al. | 376/159 |
| 4,882,121 | 11/1989 | Grenier | 376/159 |
| 4,941,162 | 7/1990 | Vartsky et al. | 378/57 |
| 5,040,200 | 8/1991 | Ettinger et al. | 378/57 |

OTHER PUBLICATIONS

Goldring, "An Improved Tilted Multifoil Assembly for Nuclear Polarization", *Nuclear Instruments and Methods in Physics Research*, vol. 254 (1987) pp. 75–78.
Broude, "Tilted Multifoil Techniques in Pad Studies of High Spin Reaction Products", *Nuclear Instruments and Methods in Physics Research*, vol. 225 (1984) pp. 31–41.
Bittner, "A Windowless High-Density Gas Target for Nuclear Scattering Experiments", *Nuclear Instruments and Methods*, vol. 167 (1979) pp. 1–8.
Tolfree, "A Review of Recent Development Work and Measurements on Carbon Stripper Foils", *Nuclear Instruments and Methods*, vol. 200 (1982) pp. 15–18.
Swann, "Lifetimes of the 6.91- and 7.12-Mev Excited States of $O^{16}$", *Physical Review*, vol. 108, No. 4, (1957) pp. 982–988.

*Primary Examiner*—Daniel D. Wasil
*Attorney, Agent, or Firm*—Rines & Rines

[57] ABSTRACT

Generating nuclear resonance-produced gamma rays of $^{14}N$, $^{16}O$ (and Cl) for scanning objects such as luggage that may contain explosives of nitrogen-oxygen (-chorine) constituents, and detecting such by Resonance Absorption Analysis (RAA) techniques, and with increased yield of gamma ray generation with novel resonance targets, thin layer and gaseous, particularly of the resonance gamma rays of $^{14}N$.

20 Claims, 6 Drawing Sheets

METHOD AND APPARATUS FOR EMPLOYING RESONANCE-PRODUCED GAMMA RAYS TO DETECT THE PRESENCE OF BOTH NITROGEN AND OXYGEN IN OBJECTS THAT MAY CONTAIN EXPLOSIVES

The Government has rights in this invention pursuant to grant Number DTRS-57-88C-00078 awarded by the Department of Transportation.

The present invention relates generically to methods of and apparatus for generating nuclear resonant reactions caused by charged particle beams, such as the generation of 9.172 MeV gamma rays resonantly absorbed by nitrogen ($^{14}$N) by, for example, an appropriate energy proton beam impinging upon a $^{13}$C-containing target; the generation of 6.92 or 7.12 MeV gamma rays resonantly absorbed by oxygen ($^{16}$O) by proton beam impingement upon a $^{19}$Fl-containing target; and/or similarly generated resonantly absorbed gamma rays in chlorine and other elements. More particularly, the invention is specifically directed to the correlation of the nitrogen density of a material with the oxygen density through both (simultaneous or sequential) nitrogen and oxygen Resonance Absorption Analysis (RAA), uniquely to distinguish explosives and the like; and further to novel techniques for oxygen RAA and resonant absorption detection, and for the enhancing, amplifying or increasing of the gamma ray yield obtainable from such nuclear resonant reactions in nitrogen, as for the purpose of detecting explosives and for other purposes with similar or related objectives.

BACKGROUND

Turning first to proposed to utilize the phenomenon of the sharp nuclear resonance provided by excitation energy of 9.172 MeV in $^{14}$N as a unique and clear signature for detecting the presence of nitrogen as in explosives that may, for example, be hidden in luggage. The gamma-ray transition rate from the ground state of $^{14}$N to this particular excited state is quite large, such that gamma rays of 9.172 MeV are very strongly absorbed by the ordinary nitrogen nuclei and thus provide a clear indication of the presence of nitrogen. Through the inverse reaction for generating such gamma rays as a probing source of detecting nitrogen—i.e., impacting an appropriate energy proton beam upon carbon 13 $^{13}$C), the reaction $^{13}$C (p,$\gamma$)$^{14}$N occurs, resulting in the generation of gamma rays with such 9.172 MeV energy at an angle of 80.5° to the proton beam direction, useful for subsequent resonance absorption in nitrogen-containing media probed by the gamma rays. The use of such resonance gamma-ray absorption to detect explosives in luggage or for other nitrogen-detecting purposes, has accordingly been suggested.

This is particularly interesting because of the sharpness of the resonance, the significant absorption probability (large integrated cross section) and the specificity to nitrogen high detection sensitivity with concomitant important insensitivity to troublesome background radiation and materials. In addition, the high penetrating properties in ordinary materials renders the probing by 9.172 MeV gamma rays substantially impervious to attempts to shield the explosive to avoid detection.

Considering the application of the invention to the inspection of luggage or the like for explosives, security of airports against clandestine bombs is of paramount importance in air travel. A substantial effort has been underway in this country and abroad to develop methods that will find hidden explosives carried on board airlines in luggage. Nuclear methods appear to be the only ones capable of testing bags for small amounts of explosive materials, rapidly, reliably and non-destructively.

One system, Thermal Neutron Analysis (TNA), is now commercially available. But TNA has many drawbacks. It is relatively slow; its sensitivity is limited; explosives may be camouflaged; and it makes the luggage radioactive. One of the alternative schemes being developed by scientists in Israel, overcomes most of the drawbacks of TNA. The Israeli method, earlier mentioned as Resonance Absorption Analysis (RAA), makes use of the before-described special resonance in the nucleus of nitrogen, a ubiquitous component of all high-performance explosives. The resonance is excited by high energy gamma rays that are passed through the examined luggage, the gamma rays themselves being producable, as previously stated, by a low energy proton beam. The system generates no radioactivity, is impossible to camouflage, results in fewer false alarms, and is, in principle, much more sensitive to small and thin explosives.

While a strong indicator of the presence of explosives, such use of nitrogen RAA is not always conclusive identification of an explosive—there being also other nitrogen-containing materials transportable in luggage and otherwise. Explosives, however, can be uniquely separated from non-explosives by measuring the oxygen concentration, again by RAA techniques, at the same time as the nitrogen RAA, and correlating the nitrogen density of a probed material with the oxygen density.

This feature of the present invention, including novel oxygen RAA techniques and resonant absorption detection, later described, enables the use of the same proton beam for the RAA of oxygen as is used for the RAA of nitrogen. In this way, a single accelerator—the largest single cost of an RAA scheme—is enabled simultaneously to measure both the oxygen and nitrogen distributions in a piece of luggage.

Since all explosive materials have high densities, typically one and half times that of water, they have relatively high nitrogen and oxygen concentrations and relatively low carbon and hydrogen concentrations. No single characteristic is unique though many common non-explosive materials have similar densities, or nitrogen concentrations. But a much smaller sub-set of materials has the high nitrogen density of explosives, and almost no common materials have both the high nitrogen and oxygen densities that characterize all explosives. While the reliable measurement of the distribution of nitrogen densities inside a bag provides an assured deterrent against explosives with few false alarms, the measurement of distributions of both the nitrogen and the oxygen inside a bag, provides that security with almost no false alarms.

Returning to the consideration of the large cost of the accelerator or generator of the proton energy, current accelerator beam requirements are at or near the limits of present day technology. If the beam requirements can be reduced by a factor of five, however, it will permit the use of off-the-shelf accelerators and thus become of practical promise.

The present invention as applied more particularly to the nitrogen RAA, enables improvement by a factor of at least ten; and in principle, it will allow the beam current to be reduced by as much as a factor of 100 without diminishing the signal strength; such being achieved by successively increasing the energy of the incident charged particle beam in the target medium at the same rate that the charged particles lose energy by collisions with corresponding successive portions of the target medium; as resonance-produced gamma rays are generated at such successive portions. This enables the use of practical proton beam sources and renders RAA practically and commercially feasible.

In the case of nitrogen, as previously stated, gamma rays of precisely 9.172 MeV will be resonantly absorbed by the nitrogen. The only practical way of creating these gamma rays is to make use of this resonant reaction itself. This is done, as earlier described, by bombarding the carbon target isotope with protons—such isotope of carbon with 7 neutrons being previously abbreviated as $^{13}C$. The protons in the impinging beam must have precisely 1,747,600 electron volts of energy (within the present uncertainty of measurement) to create the resonant gamma ray of 9.172 Mev. If the protons have 150 electron volts too much or too little energy, the resonance will be missed and the reaction will not take place effectively.

Protons, on passing through the carbon target, will lose energy by collisions with the electrons and nuclei of the carbon atoms. Protons of 1.7 Mev lose approximately 300 electron volts on traversing about 100 Angstroms of a carbon foil. The useful thickness of the carbon target is, therefore, only about 50 atomic layers, which results in an energy loss of 150 electron volts. That is a very thin target. (Nuclear physicists use the units of micrograms per square centimeter for describing target thicknesses; 500 Angstroms of carbon foil being about 1 $\mu g/cm^2$). In practice, targets 70 $\mu g/cm_2$ thick may be evaporated on thick copper blocks since these are easier to make and cool. The energy of the proton beam incident on the target has an energy somewhat above 9.172 Mev and loses energy in the layers of the thick carbon target until it has the right resonant energy for the reaction to take place.

As before stated, by successively restoring the energy loss suffered by collisions with successive foils of a target, for example, the invention enables presently available proton accelerators to be used.

It is to adapting the above-described technique for use with such practical proton sources, that the present invention is, in one of its important aspects, particularly directed. Specifically, by replacing the energy lost by the protons directed through the $^{13}C$-containing target medium portion, such as a first thin carbon layer, there is restored the original capability of the proton beam to create a second $^{14}N$ resonance-produced 9.172 MeV gamma ray generation in a next successive juxtaposed $^{13}C$-containing target portion, such as a next thin carbon layer; and so on, in seriation—each time adding appropriate voltage at each successive target portion, thereby enhancing the yield of the required gamma rays, all with the original, relatively low energy proton source. Thus the proton energy available at each successive portion of the target is rendered substantially the same as the original proton energy from the accelerator source impinged upon the first portion of the target, restoring the probability of gamma ray production at each successive target portion (or carbon foil in the above example). This successive voltage injection and energy compensation technique is also applicable, as later explained, to gaseous targets such a continuous gaseous target or an array of separate gaseous $^{13}C$-containing cells, as well.

As will later be more fully explained, the principle hereinvolved is applicable, also, to other elements than nitrogen and their corresponding targets, including as an illustration chlorine, which is also a constituent of some explosives; and combinations of such elements may also be detected in accordance with the invention.

It is accordingly an object of the invention to provide a new and improved method of and apparatus for resonance absorption measurements of both nitrogen and oxygen in objects, including in luggage and the like, substantially uniquely to detect explosives and the like through correlation of detected nitrogen density of the media with oxygen density.

A further object of the invention is to provide a novel method of and apparatus for oxygen RAA and for resonance absorption detection of resonance-produced gamma rays.

Still another object of the invention is to provide a new and improved method of and apparatus for increasing the gamma ray yield obtained in nuclear resonant reactions caused by charged particle beams, including for such purposes as the detection of constituent elements of explosives in luggage and the like, and for similar or related objectives, as well.

Another object is to provide a new and improved method of and apparatus for enhancing $^{14}N$-resonance-produced 9.17 MeV gamma ray generation by proton impingement on $^{13}C$-containing media.

Still an additional object is to provide for such enhancement of gamma ray yield from such nuclear resonant reactions in chlorine and other appropriate elements as well.

An additional object is to provide new and improved target structures particularly suited to the practice of such resonance absorption enhancement or yield-increasing methods, and useful also for other applications.

Other and further objects will be described hereinafter and are more particularly pointed out in the appended claims.

SUMMARY

In summary, therefore, the invention embraces a method of employing resonance-produced gamma rays to detect the presence of both nitrogen and oxygen content in objects such as explosives and other objects, that comprises, directing resonance-produced gamma rays of each of $^{14}N$ and $^{16}O$ upon such objects, and detecting changes in the respective intensities of such rays, indicative of resonance absorption by nitrogen-oxygen constituents in the object.

In another of its aspects, the invention also includes the method of enhancing and increasing the yield of such $^{14}N$ resonance-produced gamma rays that comprises successively increasing the energy of the incident proton beam at successive portions of a $^{14}C$-containing target medium and at the same rate that the charged particles lose energy by collisions with such successive portions of the target medium, as resonance-produced gamma rays are generated at such successive portions by such collisions.

Still a further feature of the invention resides in a method of generating resonance-produced gamma rays and employing the same to detect the presence of oxygen content in objects, that comprises, directing a beam of protons upon a $^{19}$Fl-containing target medium to produce from the collisions with the proton beam resulting gamma ray of the 6.92 and/or 7.12 MeV resonance absorption thresholds of $^{16}$O; scanning the objects by the resonance-produced gamma rays; and resonantly detecting variations in the rays intercepted by the objects to indicate such oxygen content therein.

Preferred and best mode techniques and gamma ray generating, target and detecting apparatus, including apparatus for explosive detection utilizing the same are hereinafter described in detail.

DRAWINGS

The invention will now be described with reference to the accompanying drawings, FIG. 1 of which is a schematic view of a multi-foil or layer type target assembly useful for the practice of the $^{14}$N resonance-produced gamma ray part of the invention in one preferred form;

FIG. 5 is a view similar to FIG. 3 of a modified gas cell target employing electrostatic quenching of electron-ion plasma formation, with FIG. 5A illustrating an end view, and FIG. 5B a voltage application diagram therefor;

DESCRIPTION

Figure 6:
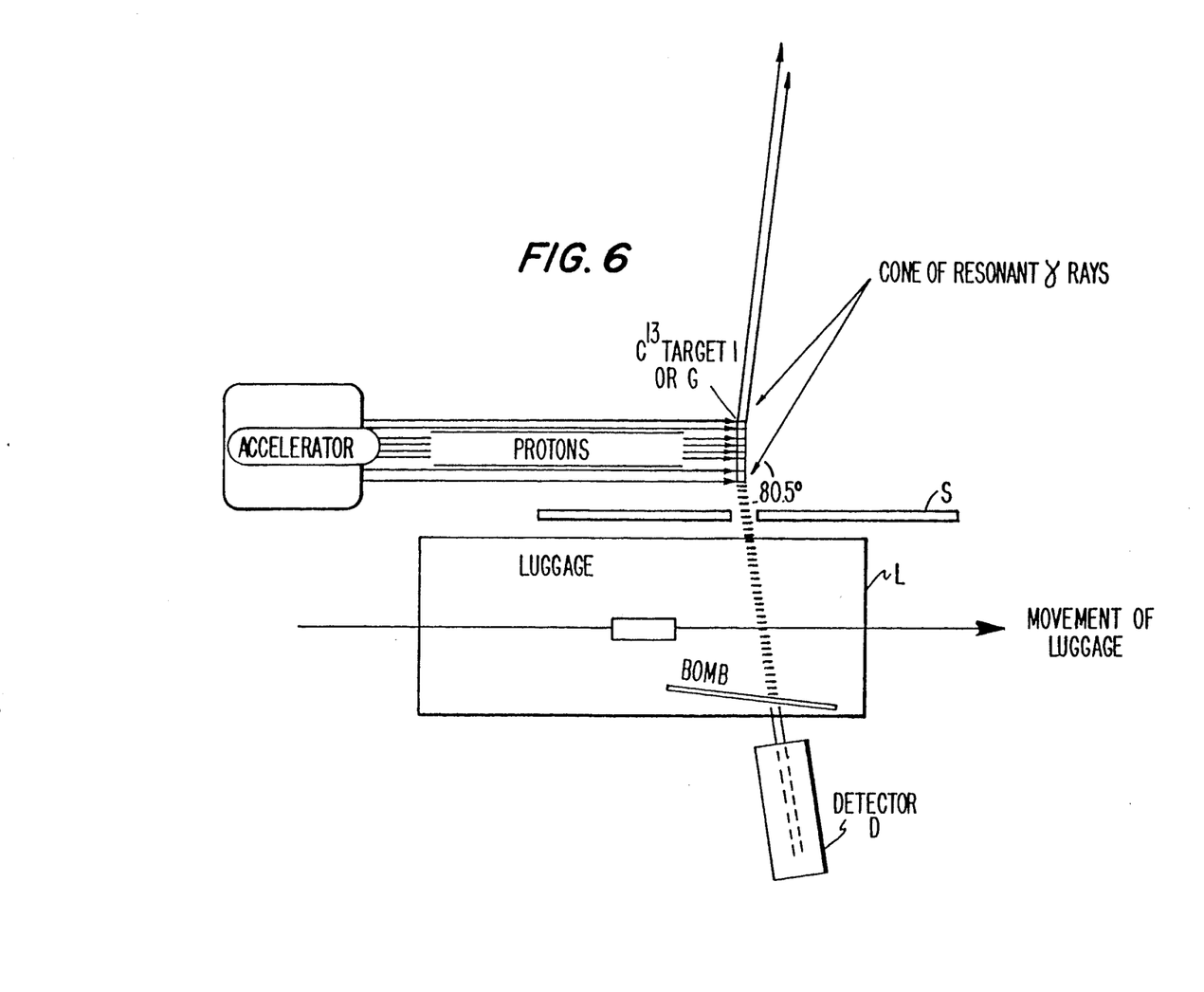
FIG. 6 is a view of the use of the systems of FIGS. 1-5B in a luggage inspection system.
Figure 7:
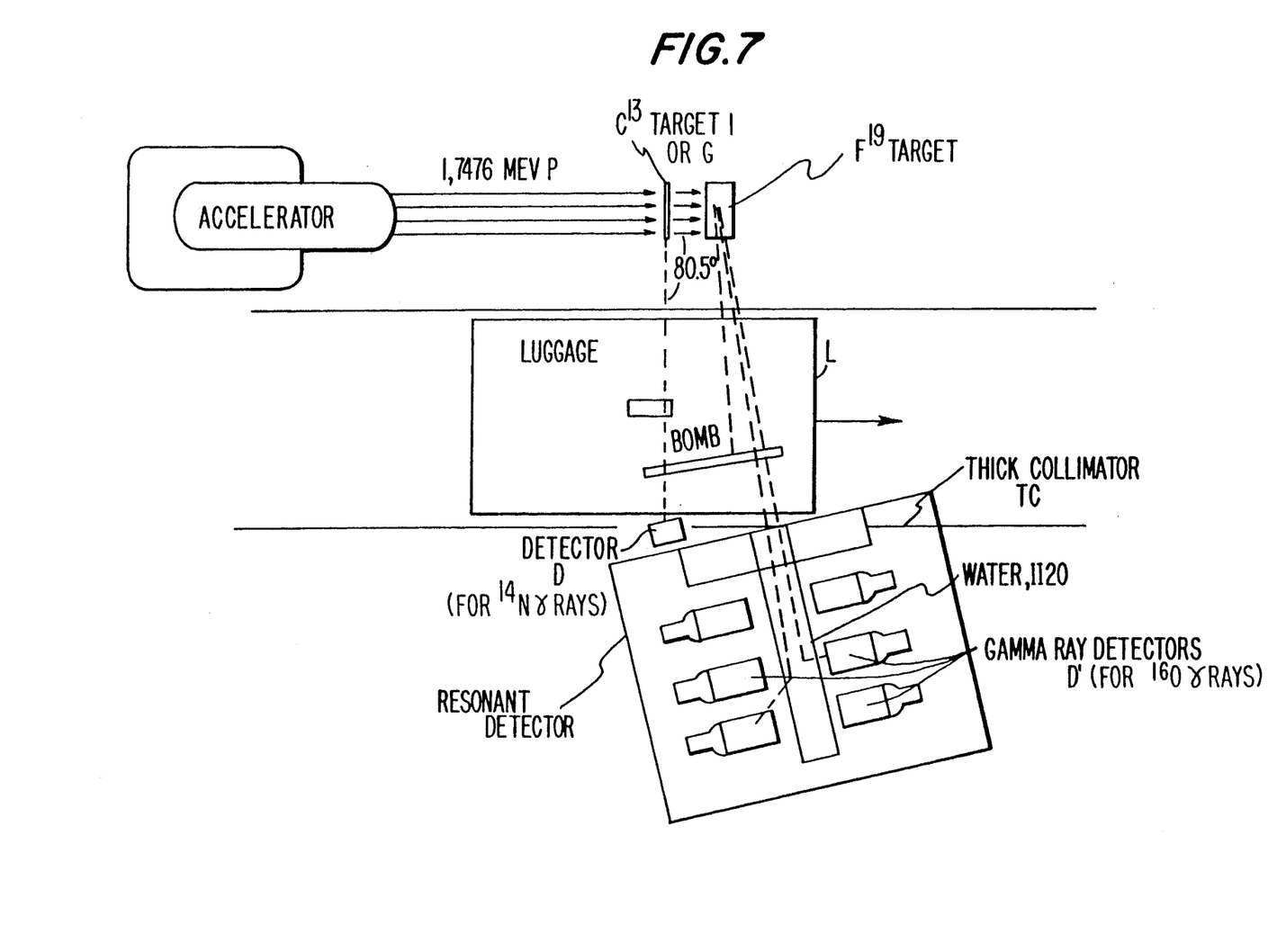
FIG. 7 is a similar view with the added $^{16}$O resonance-produced gamma ray inspection of the luggage, as well.

The invention will now be described first in connection with preferred generation of the enhanced yield $^{14}$N resonance-produced gamma rays for the purposes of the invention (FIGS. 1-5B), then in connection with the application of such enhanced yield $^{14}$N resonance-produced gamma rays to the problem of explosives detection (FIG. 6), and then to the further generation of $^{16}$O resonance-produced gamma rays and their simultaneous use with the $^{14}$N resonance-produced gamma rays for unambiguous explosives detection (FIG. 7).

Enhanced $^{14}$N Gamma Ray Generation

Figure 1:
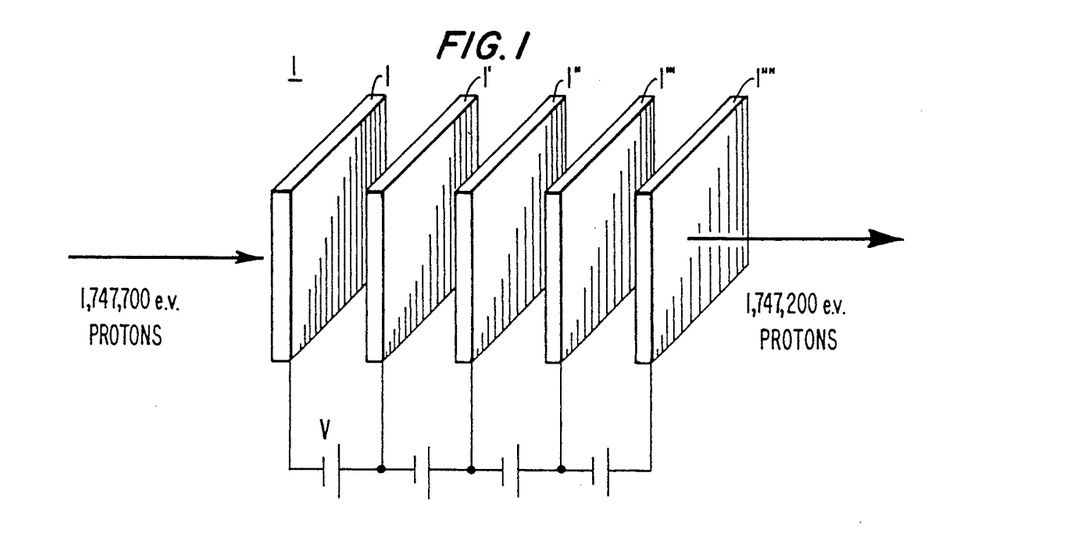

Referring to FIG. 1, a target apparatus suitable for the generation of the before-described resonance absorption 9.172 MeV of N is illustrated, incorporating the enhancing yield technique of the invention, and employing a proton beam of about 1.75 MeV. The target is shown constructed by placing a series of successive self-supporting foils 1-1'''' of carbon 13 $^{13}$C in a row—illustrated as a five-foil system. The foils may be constructed as before described, for example, as self-supported evaporated layers mounted on thin rings. If the foils are 3 micrograms/cm$^2$ each (a practical lower limit to making self-supporting foils is, at this time, about 2 micrograms per square cm.), then each foil will cause the impinging protons to lose about 500 volts of energy. In traversing a thicker 5 $\mu$g/cm$^2$ foil, the 1.75 MeV proton beam will lose about 800 volts of its energy. If an accelerating or energy-replenishing potential of about 500 volts (or 800 volts for the somewhat thicker foil) is thus supplied across successive foils as shown, then the protons will gain as much energy between successive foils as they lost in collisions in the previous foils, and the protons will stay in resonance. The limit to the number of foils that can be used is given by the multiple scattering suffered by the protons. It is estimated that multiple scattering will limit the total target thickness to about 150 $\mu$g/cm$^2$, enabling the use of at least twenty foils and more. If 2 to 3 microgram/cm$^2$ foils are used, then the yield gain may be as high as 50 or 60.

Figure 2:
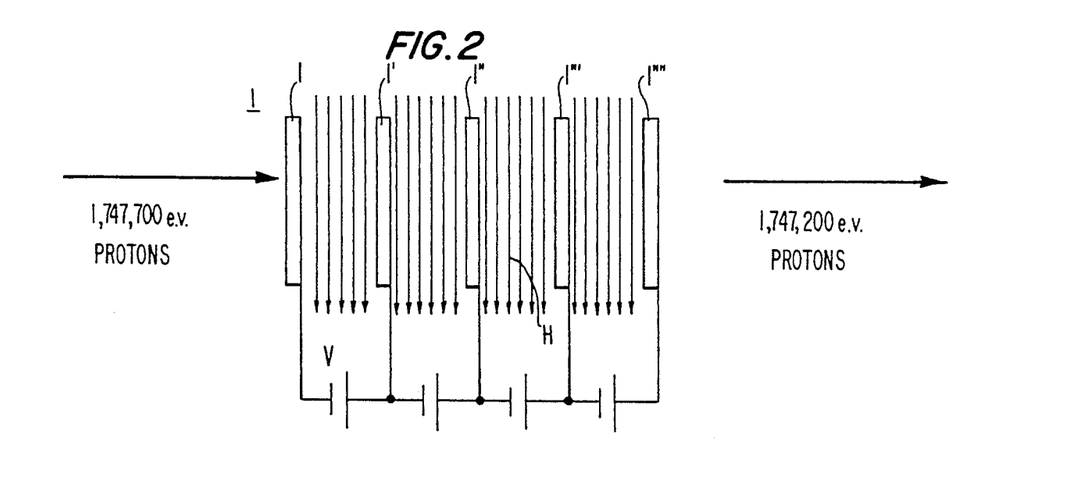
FIG. 2 is a schematic side elevational view of the system of FIG. 1 using an electron suppression magnetic field.

To obviate possible problems arising from the copious electrons ejected from the foils, a weak transverse magnetic field H may be applied, FIG. 2, that will not affect the protons, but will bend the electrons into tight spirals so that they do not cause avalanching or other detrimental problems.

Commercial foils of the separated isotope $^{13}$C are available in thicknesses as small as 3 $\mu$g/cm$^2$ from Chalk River National Laboratory, Chalk River, Canada, and Israeli foils are available in thicknesses as small as 2 micrograms/cm$^2$. Stacks of very thin carbon foils are already otherwise used in other aspects of nuclear research Goldring et al., "An Improved Tilted Multifoil Assembly for Nuclear Polarization", *Nuclear Instruments and Methods in Physics Research*, Vol. 254 (1987) pp. 75–78; Broude et al., "Tilted Multifoil Techniques in pad Studies of High Spin Reaction Products", *Nuclear Instruments and Methods in Physics Research*, Vol. 225 (1984) pp. 31–41).

Free-standing foil targets (as opposed to a target evaporated onto a water-cooled metal plate) can be destroyed by heat and radiation damage if the beam currents are too high. A 5 $\mu$g/cm2 carbon foil may rupture quickly if exposed to the very high currents of 1.75 MeV protons. The lifetime of such foils, however, can be increased by one or more of the following techniques: (1) increasing the beam diameter so that the heat and radiation damage are spread over a wider area; (2) cooling the foils by, for example, helium gas; (3) rotating or indexing foils so that individual foils are exposed to the beam only a fraction of the time; or (4) special foil preparation as documented in the literature Bittner et al., "A Windowless High-Density Gas Target for Nuclear Scattering Experiments", *Nuclear Instruments and Methods*, Vol. 167 (1979) pp. 1–8: Tolfree, "A review of Recent Development Work and Measurements on Carbon Stripper Foils", *Nuclear Instruments and Methods*, Vol. 200 (1982) pp. 15–18).

The amplification gain will be limited by the minimum thickness of robust, free-standing carbon foils. As before described, the thinnest targets presently available are about 3 $\mu$g/cm2 thick, though 5 $\mu$g/cm$^2$ may be more standard. The effective foil thicknesses will generally be greater since the foils have non-uniformities and are purposefully wrinkled to increase their life. The maximum amplification gain will be given by the maximum tolerable energy loss divided by the energy lost per foil; for example, about 40 kev/0.8 kev=50 —a number earlier presented.

The practical problem of making and mounting large numbers of very thin carbon foils made of a highly enriched isotope adds complexity and cost if the foils have to be replaced often. At maximum amplification, perhaps as many as 50 foils may be used at once. Perhaps 10 times that number will be needed for replacement, for example, in a rotating wheel, target cassette. The cost of the system may be high if the foils have to be replaced more frequently than, say, about once a month.

Windowless gas targets can overcome some of the above-described disadvantages by using either continuous or discrete energy-loss cells with $^{13}$C-containing gas.

Figure 3:
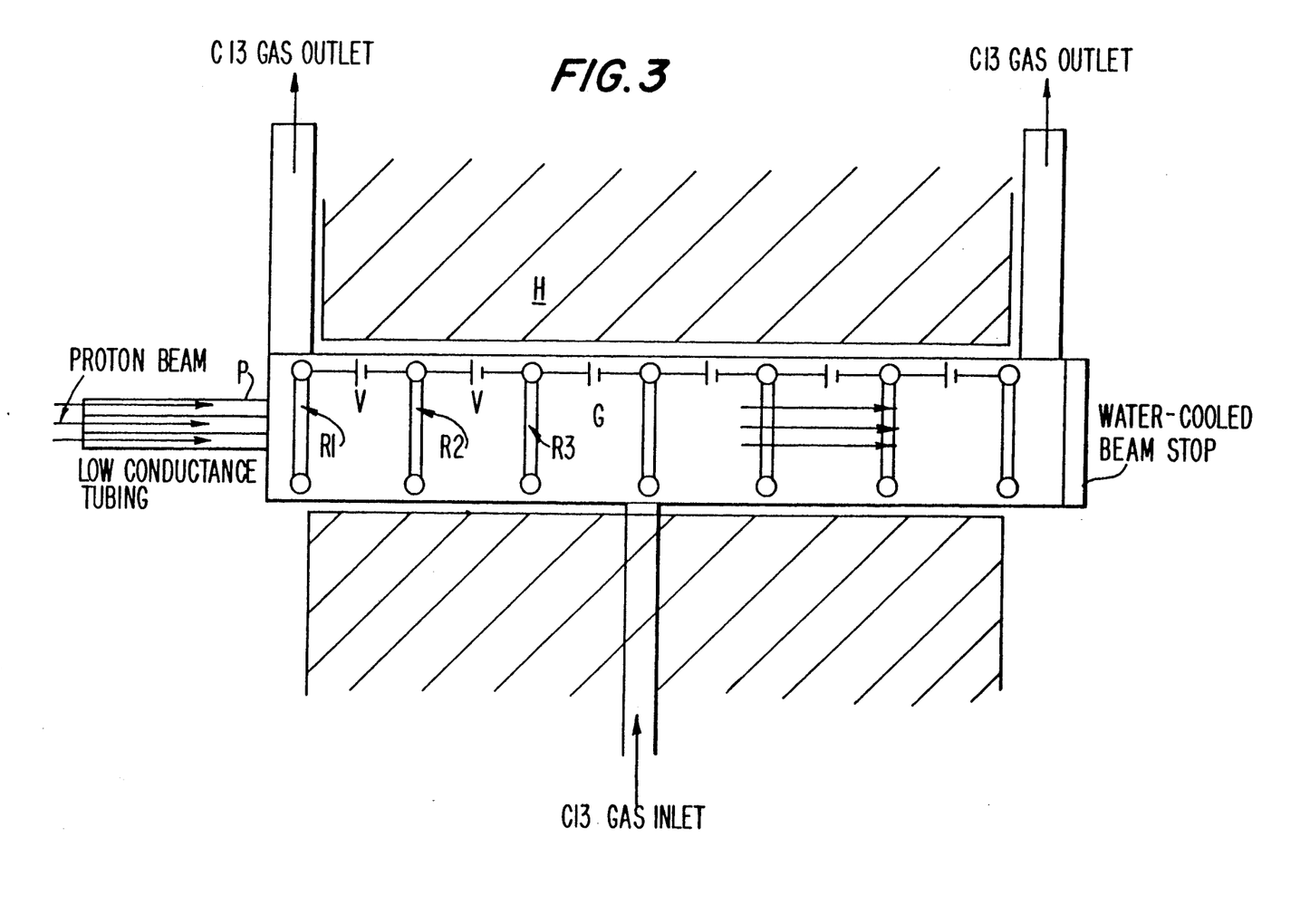
FIGS. 3 and 4 are similar views respectively of a continuous gaseous target assembly and an array of gas cells, using the gamma ray yield-increasing method of the invention.

FIG. 3 shows the principal elements of a continuous resonance gas target illustrated as a cell G, one meter long, filled with $^{13}$C-doped methane ($CH_4$) at a pressure of 1.0 Torr. (Other suitable gases include $CO_2$ and CO). The few watts of beam power dissipated in the cell are easily dealt with. The windowless gas target can withstand any current that a modern proton beam accelerator can produce. The proton will lose 40 kev on traversing the meter-long cell. If 11 kilovolts are applied in increments along (parallel to) the path length, then the protons will gain energy in step with losing it, so as to maintain resonance throughout the length of the cell, with the system being tuned by scanning the accelerator voltage and producing gain of the order of about 100.

Among the advantages of such a windowless gas cell G are the fact that it will not be damaged by the proton beam, no matter how intense. The amplification factor will be at least 2 and more likely at least 4 times that attainable with a multiple-foil target. This factor may be estimated as follows for the exampled cell of FIG. 3. The thickness of the cell can be made 250 $\mu g/cm^2$. The energy loss will be 160 to 250 e.v./$\mu g/cm^2$=40 kev. (The acceptable energy loss has been taken to be about the same as with a carbon foil target; in fact the acceptable energy loss will be significantly greater since methane multiply-scatters less than pure carbon.) The expected gain in radiation intensity is given by the ratios of the total energy loss divided by the intrinsic width of the state, reduced by the dilution (by hydrogen) in carbon in the gas cell; i.e., $(40000/16) \times (120/250) = 120$. Thus, in principle, one will gain at least a factor of 2 over foils. By increasing the allowable total energy loss, the ideal amplification could be as much as 200; that is, a gain of 4 over the use of foils.

Gas targets are not, however, without their own problems. There is first the operation of a cell G, FIG. 3, at a pressure of 1-10 Torr, that is connected directly to the main accelerator source of proton beam, typically operated at vacuum pressures of $10^{-5}$ Torr or less. Second, is the complication of electrons in the gas that are generated as the proton passes through. Third, is the fact that the successive portions of the target are now spread out over, for example, a meter of length in the example of FIG. 3.

Windowless gas targets, however, have been used for other applications by nuclear physicists for many decades. (See, for example, the earlier mentioned article of Bittner et al. To isolate the low vacuum volume of the cell G from the high vacuum volume of the proton source one must connect the two with a low gas conduction pipe P and provide adequate pumping at the connection point so that the high vacuum is maintained. The pumping must be done in a closed loop so that the $^{13}$C-containing gas does not have to be replaced frequently. The low-conductance connection P is illustrated as consisting of several (perhaps a bundle) of long, relatively small diameter tubes that represent a high resistance to the gas flow, while passing the nearly parallel proton beam with very little loss of intensity. The closed-loop pump before-mentioned has a condenser kept at a temperature below the liquification point of the gas. Liquid air may be used for the before-described illustrative methane. The gas is liquified as it is pumped by the condensor and is subsequently evaporated for pumping back into the cell at the "Inlet".

As in the case of the thin $^{13}$C-containing layers constituting the target medium in the embodiment of FIGS. 1 and 2, the successive portions of the continuous gas cell target G will be provided with successive voltage boosts V to replace the lost energy in the proton ionization of such successive portions that results in generating the desired gamma rays. Whereas with the carbon stack of FIGS. 1 and 2, substantially equal voltages V are introduced by connection between successive films to restore the loss of energy in the proton beam colliding with each successive portion and thereby generating the resonance gamma rays, similar operation is attained in the gas target of FIG. 3 with the aid of conductive rings $R_1$, $R_2$, $R_3$, etc. defining successive portions of the gas target medium G and between which rings the before-mentioned proton-energy-restoring voltage increments V are supplied.

The protons lose their energy in the target G primarily by ionizing the gas atoms. Each ionization requires about 30 e.v. of energy so that approximately 1200 electrons and positive ions will be created by each proton that passes through the exampled gas cell target; that is, about twelve electron-positive ions per cm. The electrons will "see" the accelerating voltage and be attracted to the positive electrode. The ions will be attracted by the negative electrode but are moving slowly and thus present no serious problem. The free electrons will accelerate until they too become ionizers of the atoms of the target gas. If preventive measures are not taken, accordingly, a plasma of electrons and positive ions will build up with a space charge that effectively can shield the gas cell from the external accelerating potential.

In accordance with the invention, thus, the cascade is quenched before it begins, by applying an external transverse magnetic field H, so-labelled in FIG. 3, that will prevent the electrons from gaining sufficient energy to ionize. An external field of 100 Gauss, for example, will cause the low-energy electrons (typical energies are only a few e.v.) to curl up with a small radius of curvature and drift at constant speed through the cell. Such a 100 Gauss field H will bend the protons with a radius of curvature of 20 meters which can easily be accommodated in the design. If the bending of the protons becomes a problem—and it will be if a larger magnetic field is needed to quench an electron produced plasma—then alternating magnetic fields can be applied along the length of the cell so as to give no net deflection to the proton beam.

Figure 4:
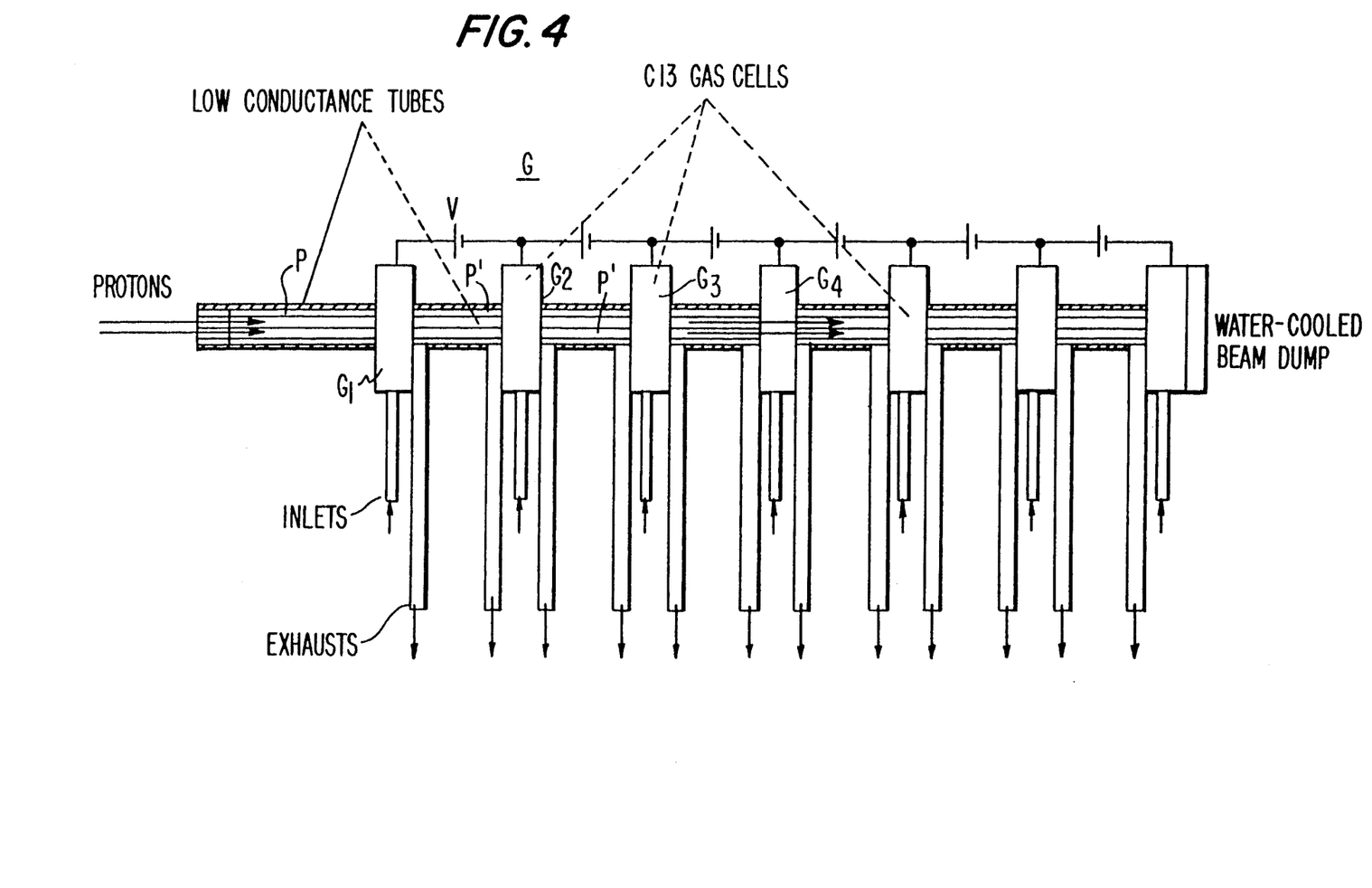

The potential for plasma problems in gas target media, however, can be obviated if one separates the continuous gas cell target G of FIG. 3 into a series of successive individual cavities $G_1$, $G_2$, $G_3$, etc., FIG. 4, each of which has a gas portion thickness that results in an energy loss of about 160 e.v., the natural width of the resonance line. The successive cells are electrically isolated so that only the applied potentials V between the successive cells produce the proton energy loss compensation or acceleration.

The principal problem with such discrete target cells $G_1$, $G_2$, $G_3$, etc., is the mechanics of connecting the cells together. The energy lost by the protons on traversing the low-conductance tube connectors P' between cells should be small compared to 160 e.v. Thus, the length of each connector P' times the pressure in the connectors should be at least ten times smaller than that of the cells. In the geometry of FIG. 4, a separate resonant gas inlet is provided into each cell, and an exhaust line on each side of every interior cell, so-labelled. Differentially-pumped gas cells used routinely in nuclear physics in tandem accelerators for the very different purpose of "stripping" electrons off from energetic ions to make those ions more positively charged, may be used here as each of the discrete gas cells $G_1$, $G_2$, $G_3$, etc., in an overall system of 50 to 100 cells. In practice, the cell length may be about 1 cm.

Figures 5, 5A, 5B:
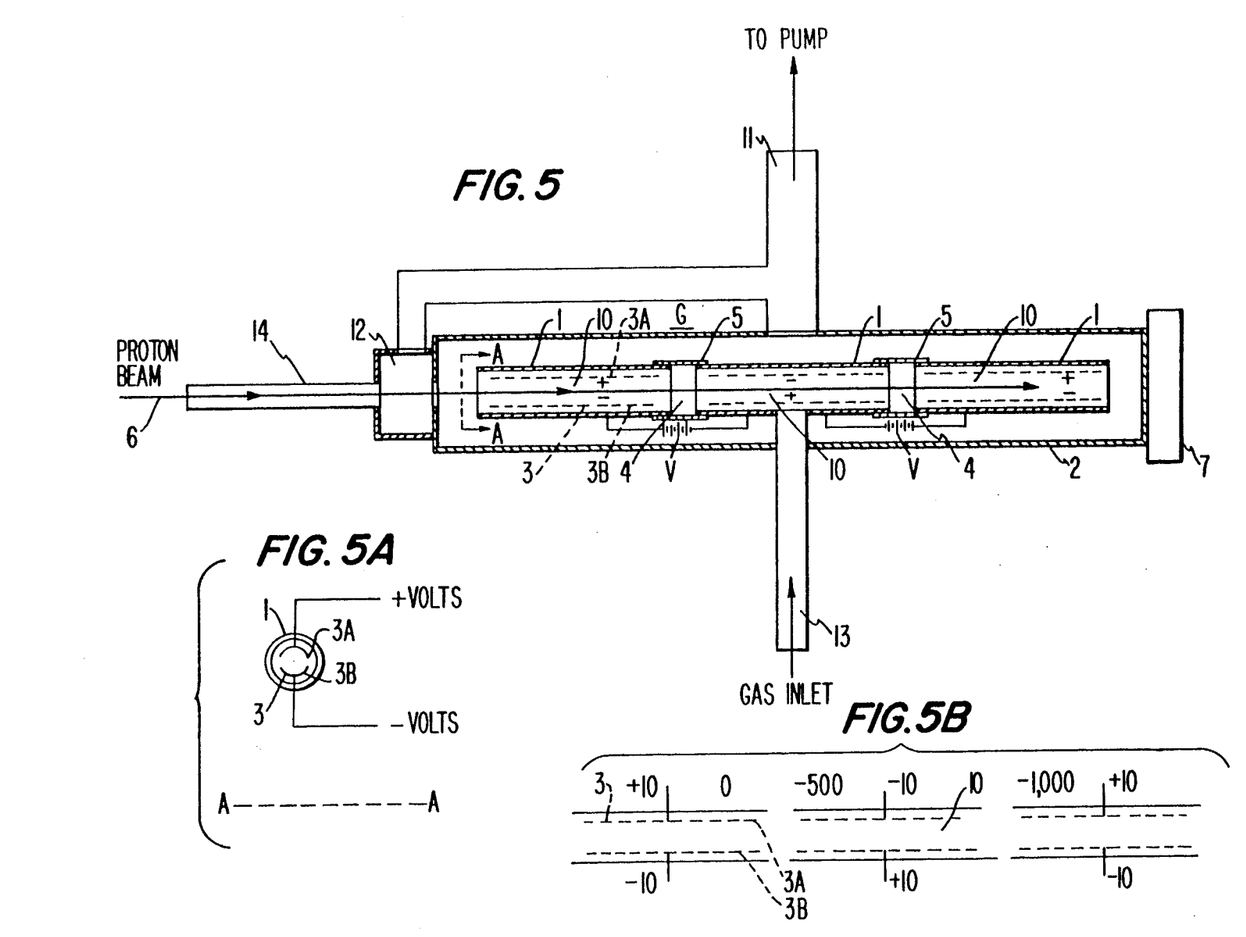

Techniques for electrostatically quenching ion formation in gas cell targets may also be employed. FIG. 5 illustrates a gas cell accelerator target for $^{14}N$ gamma ray resonance absorption in which the electrons and positive ions, generated in the gas by the incident proton beam, are pulled out of the beam by a low-voltage electrostatic collector in the beam line. This embodiment combines the long continuous gas target G of FIG. 3 with the acceleration electric field uniform throughout the length of the target, with the series of separate gas cells $G_1$, $G_2$, $G_3$, etc. of FIG. 4 with the accelerating potentials between each cell, with significant advantages. The FIGURE shows the scheme with three cells; but, in practice, the target could have as many as 50; the limit being degradations due to multiple scattering and energy fluctuations.

The basic idea of FIG. 5 is to use a single gas beam target line medium that is segmented into a number of electrically independent tube portions 1, with the accelerating potentials or compensating V applied between them. The continuous target tube requires, in principle, only one gas inlet 13 and one gas outlet 11, thus greatly reducing the pumping requirements on the vacuum system. In practice one may want several inlet lines, but the gain over the previously described system of FIG. 4 seems to be still substantial. The "high pressure" targets 1, which might be operated at pressures of about 1 Torr, are isolated from the main photon accelerator 6 by a large volume 12 connected to the high-speed pump and a relatively small diameter beam line 14, that has a high resistance to gas flow. The adjacent conductor tube portions 1 are electrically insulated by sealed, non-conducting sleeves 5 which maintain separation gaps 4 so that an electrical potential difference V established between the adjacent tube portions 1 results in an electric accelerating field on the protons passing down the axis of the target. The final beam stop 7 is water cooled. Each target portion 1 has a length that is several times its diameter, serving thus as an effective Faraday cage, isolated from all external fields.

A cylindrical metal mesh electrode 3 is shown inserted into each tube portion 1, of diameter larger than that of the proton beam 6 and electrically isolated from the sections 1. The cylindrical mesh 3, in turn, is split into electrically isolated halves 3A and 3B, FIG. 5A. A voltage is placed across the halves so that electrons and ions, formed in the space 10 are pulled to the positive and negative halves 3A and 3B (+ and−) of the mesh 3 and never get accelerated across the gap 4, between the target portions 1; i.e., providing electrical ion quenching. It is worth noting that, if desired, the insulator sleeves 5 can be modified so that the beam sees only conductors.

An example of possible voltages is shown in FIG. 5B, with the respective cylindrical mesh grids 3A and 3B having bias voltages of $+10$ and $-10$ volts. The target portions or segments 1, have 0, −500 volts and −1,000 volts on them giving an acceleration potential of 500 volts across each L gap to make up for a proton energy loss of 500 electron volts in successive portions, as earlier described in connection with the embodiments of FIGS. 1–4. A possible set of dimensions may be as follows: Length of single segment = 1 cm, chosen to match the detector size of 1 to 2 cm at 1 meter from the target. Diameter of each beam segment = 4 mm. Diameter of inner grid 3 = 3.8 mm. Diameter of proton beam = 3 mm. Gap 4 between segments = 4 mm.

Application of the Enhanced Yield $^{14}N$ Gamma Rays to Explosives Detection

Turning now to the use of the enhanced yield generated gamma rays in the systems of FIGS. 1–5B for the previously described application of detecting explosive materials in luggage, reference is made to the embodiment of FIG. 6. Remembering that, as before explained, almost all explosives have high nitrogen and oxygen characteristic densities; by reliably measuring the distribution of nitrogen densities inside luggage that may conceal explosives, detection of such explosives with few false alarms is achieved.

FIG. 6 shows the basic geometry of the $^{14}N$ resonance gamma ray cone produced by the $^{13}C$-containing targets of FIGS. 1–5B over a one −degree angle at 80.5° with respect to the proton beam direction (horizontal in FIGS. 1–5), and the appropriate positioning or movement of the luggage L to intercept the same. It is very similar to the familiar X-ray system used to scan luggage in airports; but instead of a fan-beam of X-rays passing through the bags, a narrow cone of precisely the right energy gamma rays is employed passing through collimating slits S and then through the luggage L and into an array of detectors D. Nitrogen in the luggage preferentially absorbs these resonant gamma rays, as before explained, causing a dip in the signal strength; the before-described Resonance Absorption Analysis (RAA). The method is a very sensitive technique for finding nitrogen, and it is capable of spatial resolutions of the order of a cubic inch. It is almost impossible to thwart and it uses no neutrons and makes nothing radioactive.

While such detection of $^{14}N$ resonance gamma rays is a necessary condition to the technique of the invention in detecting explosives, the sufficient condition requires also detecting the $^{16}O$ resonance gamma rays, as well. As before stated, explosives are uniquely separable from non-explosives by correlating the nitrogen density of a material with its oxygen density. The invention, as previously explained, also allows simultaneous use of RAA for oxygen at the same time as for nitrogen, thus uniquely discriminating explosives from non-explosives.

$^{16}O$ Gamma Ray Generation and Supplemental Use with $^{14}N$ Gamma Rays While in the embodiments of FIGS. 1–5B, resonance absorption of nitrogen has been considered, the present invention also provides for the resonance absorption method of measuring oxygen in explosives. The oxygen concentration is measured by determining the intensity change of $^{16}O$ resonant gamma rays that are transmitted through the luggage or other container of the suspected explosives and detected this time by a resonant detector that is sensitive only to such resonant gamma rays. Unlike the 80.5° cone of $^{14}N$ gamma rays, the resonant $^{16}O$ gamma rays are emitted in all directions to the proton beam direction, and require a special resonance absorption detection apparatus in the direction of the passing luggage—say along the same 80.5° direction. The same incident proton beam for RAA of nitrogen may also be employed for RAA of oxygen as shown in FIG. 7. In this way, the same proton accelerator—the largest single cost of an RAA scheme—may be used simultaneously to measure both the oxygen and nitrogen distributions in a piece of luggage or the like.

The previously mentioned states in $^{16}O$ at 6.92 and 7.12 MeV have been observed resonantly to fluoresce; the 6.92 MeV resonance being the stronger (see C.P. Swann et al., "Lifetimes of the 6.91 and 7.12 MeV Excited States of $O^{16}$", *Physical Review*, Vol. 108, No. 4, 982-988). It is desirable to reach these states with a proton beam whose energy is less than 1.75 MeV, the energy needed to excite the 9.17 MeV state in $^{14}N$ by the (p, gamma) reaction on $^{13}C$ before described, FIGS. 1–5. The following reaction, while not the only one to produce the desired states, yields copious numbers of the resonant gamma rays for proton energies extending from 1.75 MeV down to about 0.5 MeV.

The 6.92 MeV and 7.12 MeV states are strongly excited by the reaction:

The symbol * means excited.

The reaction is exoergic by 8.11 MeV so that it proceeds, in principle, for any proton energy above zero; but in practice, the cross section for the reaction is strong for proton energies above about 0.5 MeV.

The 6.92 and 7.12 MeV gamma rays are produced from an excited oxygen nucleus that is recoiling rapidly due to the momentum given it by the combination of the incident proton and the emitted alpha particle. As a consequence, only a very small fraction of the 6.92 or 7.12 MeV gamma rays will be in resonance with corresponding states in an oxygen target.

The small fraction of resonant gamma rays produced per reaction is made up for by the large cross section for the production of the gamma rays and by the fact that one can make use of more than 1 MeV of energy loss to create the gamma rays in the system of FIG. 7. The combination of these favorable factors makes the production of resonant gamma rays in oxygen about that for the 9.17 MeV gamma ray in $^{14}N$.

As above explained, the resonant component of 6.92 and 7.12 MeV gamma rays is rather independent of the angle of emission in sharp contrast to the 9172 MeV gamma rays emitted by $^{14}N$ in resonance, which, as before stated, occurs only over a 1 degree angle at 80.5° with respect to the beam direction. It is therefore necessary to count the gamma rays with a resonant detector as earlier stated.

Thus, in the embodiment of FIG. 7, in addition to the $^{14}N$ gamma rays produced from target $^{13}C$ as shown in FIG. 6, the same proton beam is passed to a $^{19}F$ target. The 6.92 and 7.12 MeV gamma rays thus generated are shown penetrating the luggage L and resonantly detected by resonant gamma ray detectors D', later described. As shown( the detection is sequential with the luggage passing the $^{14}N$ gamma rays detected at D and then the $^{16}O$ gamma rays at D'; but the inverse order, or substantial simultaneity are feasible also.

In connection with the $^{14}N$ gamma ray generation, if one uses non-resonant detectors D, then a long gamma ray generating gas cell, as of the type shown in FIGS. 3–5, may require counters carefully collimated with lead or tungsten so that each detector "sees" the gamma ray narrow cone from only one slice of the luggage or other object at any given time. The long cell type of target before described, however, can be of decided advantage if one uses resonant detectors that respond only to those gamma rays that are precisely in resonance. Such detectors are intrinsically collimated since they only respond to gamma rays that originate at precisely the correct angle from the target.

Another simple geometry that makes use of resonant detectors surrounding a long gas cell target medium may consist of a tunnel of resonant detectors deployed around the target gas cell (not shown). Each array of detectors may contain, for example, 100 detectors, each about 2 cm wide, with their front faces about 1.2 meters from the gas cell. Forty such rings could be used making a total of 4,000 detectors. While the detector/electronics for such a system is expensive (though resonant detectors are inexpensive to make), such a system can be cost effective if it processes about 20 or 30 bags a minute.

The use of such gas target gamma ray generation appears well adapted to the luggage detection problem. The transport of a beam of 1.75 MeV protons from one location to another many meters away is easy and relatively inexpensive. Vacuum plumbing and pumping are not expensive; and permanent magnets with a fixed field can be used to bend the beam (through 180 degrees if necessary) since the beam energy is constant. It is therefore practical to think of separating the individual gas cell targets (or groups of such targets) by substantial distances to make several independent explosive detection stations. These stations may be used to examine the bag in a special orientation, or for longer times. The stations may also be used to speed the baggage handling by having two or more independent streams of bags examined simultaneously. The latter gets more attractive the more intense the proton beam currents and the more efficient one makes the gamma ray detectors.

Returning to the $^{16}O$ gamma ray resonance generation with the use of the $^{19}F$ target of FIG. 7 supplementing the $^{13}C$-containing target, the resonant detector of FIG. 7 is shown comprising a thick collimator TC through which the 6.92 or 7.12 MeV gamma rays at that angle will be passed into a water chamber ($H_2O$) surrounded by gamma ray detectors responsive to the re-emitted resonance gamma rays resulting from absorption in the water, and providing sensitive and amplified detection of these gamma rays, also.

While separate $^{13}C$-containing and $^{19}Fl$-containing targets are shown employed in the system of FIG. 7, a combined gaseous target medium of mixed appropriate gases may be achieved. Alternatively, gaseous compounds for enabling resonance gamma ray generation for both $^{14}N$ and $^{16}O$ may be employed; for example, $^{13}CF_4$ or $^{13}COF_2$—the $^{13}C$ for the nitrogen and the natural fluorine for the oxygen. Appropriate organic fluorocarbons may also be used.

As previously mentioned, moreover, the several features of the invention are not limited in their broader concept and application to just $^{14}N$ and $^{16}O$. Combinations of chlorine and nitrogen are also found in some explosives, as well. In such cases, a gaseous target medium containing both carbon and sulphur would be employed, such as $^{13}CO^{34}S$ or $13_{cs2}34$. It may be desirable, furthermore, to generate a non-resonant gamma ray that can be used for normalizing the resonant signal. Here, too, one might use a fluorine target to generate both 6.92 MeV and 7.12 MeV gamma rays for that normalization.

Further modifications will also occur to those skilled in this art and such are considered to fall within the spirit and scope of the invention as defined in the appended claims.

What is claimed is:

1. A method of employing resonance-produced gamma rays to detect the presence of both nitrogen and oxygen content in objects that may contain explosives, that comprises, directing resonance-produced gamma rays of each of $^{14}$N and $^{16}$O upon such objects and detecting changes in the respective intensities of such rays as they pass through the object, indicative of resonance absorption by both nitrogen and oxygen constituents in the object, the $^{14}$N resonance-produced gamma rays being of 9.172 MeV and the $^{16}$O resonance-produced gamma rays being of 6.92 and/or 7.12 MeV.

2. A method as claimed in claim 1 and in which the respective $^{14}$N resonance-produced and $^{16}$O resonance-produced gamma rays are generated by directing appropriate energy protons upon a $^{13}$C-containing target medium and upon a $^{19}$Fl-containing target medium.

3. A method as claimed in claim 2 and in which said proton energy is of the order of 1.75 MeV.

4. A method as claimed in claim 2 and in which the yield of said $^{14}$N resonance-produced 9.172 MeV gamma rays is increased by successively increasing the energy of the protons at corresponding successive portions of the said $^{13}$C-containing target medium and at the same rate that the protons lose energy by collisions with such successive portions of the target medium, which collisions generate such resonance-produced gamma rays.

5. A method as claimed in claim 4 and in which said yield increasing is effected by applying successive voltage increments between such successive portions of the $^{13}$C-containing target medium.

6. A method as claimed in claim 5 and in which the successive voltage increments are of the order of 500 volts.

7. A method as claimed in claim 2 and in which the object is positioned to be intercepted by the $^{14}$N resonance-produced 9.172 MeV gamma rays at an angle of about 80.5° to the direction of the protons and the detecting of the intensity of these rays is effected after passage through said object.

8. A method as claimed in claim 7 and in which the object further intercepts those 6.92 and 7.12 MeV $^{16}$O resonance produced gamma rays emanating toward the object, and the intensity of the same are detected by resonance absorption after passing through the object.

9. A method as claimed in claim 2 and in which the said target media comprise a mixture or compound in a gaseous medium form containing $^{13}$C and $^{19}$Fl constituents.

10. A method of employing resonance-produced gamma rays to detect the concurrent presence of both nitrogen and oxygen content in objects, that comprises, generating resonance-produced 9.172 MeV gamma rays of $^{14}$N and 6.92 and/or 7.12 MeV gamma rays of $^{16}$O; directing the rays upon such objects; and detecting changes in the respective intensities of such rays as they pass through said objects, indicative of resonance absorption by both nitrogen and oxygen constituents in the object.

11. A method as claimed in claim 10 and in which the respective detected changes indicate the respective nitrogen and oxygen densities in the object, and such nitrogen and oxygen densities are correlated to identify the object.

12. A method as claimed in claim 10 and in which the respective 9.172 MeV and 6.92, 7.12 MeV gamma ray generation is effected by directing appropriate energy protons upon a $^{13}$C-containing target medium and upon a $^{19}$Fl-containing target medium, respectively.

13. A method as claimed in claim 12 and in which said proton energy is of the order of 1.75 MeV.

14. A method as claimed in claim 12 and in which the yield of said $^{14}$N resonance-produced 9.172 MeV gamma rays is increased by successively increasing the energy of the protons at corresponding successive portions of the said $^{13}$C-containing target medium and at the same rate that the protons lose energy by collisions with such successive portions of the target medium, which collisions generate such resonance-produced gamma rays.

15. Apparatus for employing resonance-produced gamma rays to detect the presence of nitrogen and oxygen in objects that may contain explosives, having, in combination, means for generating resonance-produced 9.172 MeV gamma rays of $^{14}$n and 6.92 and/or 7.12 Mev gamma rays of $^{16}$O; means for directing such resonance-produced gamma rays upon such objects; and means for detecting changes in the respective intensities of such rays as they pass through said objects resulting from resonance absorption by both nitrogen and oxygen constituents in the object indicative of the presence of explosives therein.

16. Apparatus as claimed in claim 15 and in which the generating means comprises means for producing a proton beam and directing the same upon respective $^{13}$C-containing and $^{19}$Fl-containing target media to generate the respective $^{14}$N and $^{16}$O resonance-produced gamma rays.

17. Apparatus as claimed in claim 16 and in which means is provided for increasing the yield of said $^{14}$N resonance-produced gamma rays by means for successively increasing the energy of the protons of the beam at corresponding successive portions of the said $^{13}$C-containing target medium and at the same rate that the protons lose energy by collisions with such successive portions of the target medium, which collisions generate such resonance-produced gamma rays.

18. Apparatus as claimed in claim 17 and in which such yield increasing means comprises means for applying successive voltage increments between such successive portions of the $^{13}$C-containing target medium.

19. Apparatus as claimed in claim 18 and in which the said voltage increments are of the order of about 150–800 volts.

20. Apparatus as claimed in claim 15 and in which mean sis provided for moving the objects possibly containing explosives to intercept the resonance-produced gamma rays.

* * * * *